United States Patent [19]

Yanagi

[11] Patent Number: 5,223,869
[45] Date of Patent: Jun. 29, 1993

[54] PROJECTOR

[75] Inventor: Haruyuki Yanagi, Yokohama, Japan

[73] Assignee: Canon Kabushiki Kaisha, Tokyo, Japan

[21] Appl. No.: 658,047

[22] Filed: Feb. 20, 1991

[30] Foreign Application Priority Data

Feb. 20, 1990 [JP] Japan .................. 2-037434

[51] Int. Cl.[5] .................. G03B 21/10
[52] U.S. Cl. .................. 353/78; 353/74; 353/99; 358/60; 358/231
[58] Field of Search .................. 353/77, 78, 79, 94, 353/99, 98, 73, 37, 31, 30, 74, 38; 358/60, 64, 231, 237

[56] References Cited

U.S. PATENT DOCUMENTS

| | | | |
|---|---|---|---|
| 3,944,351 | 3/1976 | Ito et al. | 353/31 |
| 4,439,027 | 3/1984 | Shioda et al. | 353/77 |
| 4,544,946 | 10/1985 | VanBreemen | 358/60 |
| 4,578,710 | 3/1986 | Hasegawa | 353/78 |
| 4,708,435 | 11/1987 | Yata et al. | 353/77 |
| 4,963,016 | 10/1990 | Heijnemans et al. | 353/78 |
| 4,995,718 | 2/1991 | Jachimowicz et al. | 353/33 |
| 5,048,949 | 9/1991 | Sato et al. | 353/77 |

FOREIGN PATENT DOCUMENTS

| | | | |
|---|---|---|---|
| 0204687 | 12/1982 | Japan | 358/237 |
| 0094286 | 6/1983 | Japan | 358/60 |

*Primary Examiner*—William A. Cuchlinski, Jr.
*Assistant Examiner*—William C. Dowling
*Attorney, Agent, or Firm*—Morgan & Finnegan

[57] ABSTRACT

A projector suitable for a rear projection type receiver is disclosed. The projector has a device for generating an image and an image projecting device for projecting the image to a screen. The image projecting device includes a projection lens system and a reflector. The projection lens system directs the light flux indicative of the image from the image generating device toward the reflector so as to be away from the screen. The reflector bends the light flux and directs the light flux from the reflector to the screen along a predetermined path. The image generating device and the projection lens system are arranged on the side of the predetermined path along the path.

57 Claims, 8 Drawing Sheets

PROJECTOR

BACKGROUND OF THE INVENTION

1. Field of the Invention

The present invention relates to a projector and, more particularly, to a projector which is suitable for a rear projection type receiver.

2. Related Background Art

Figure 1A:
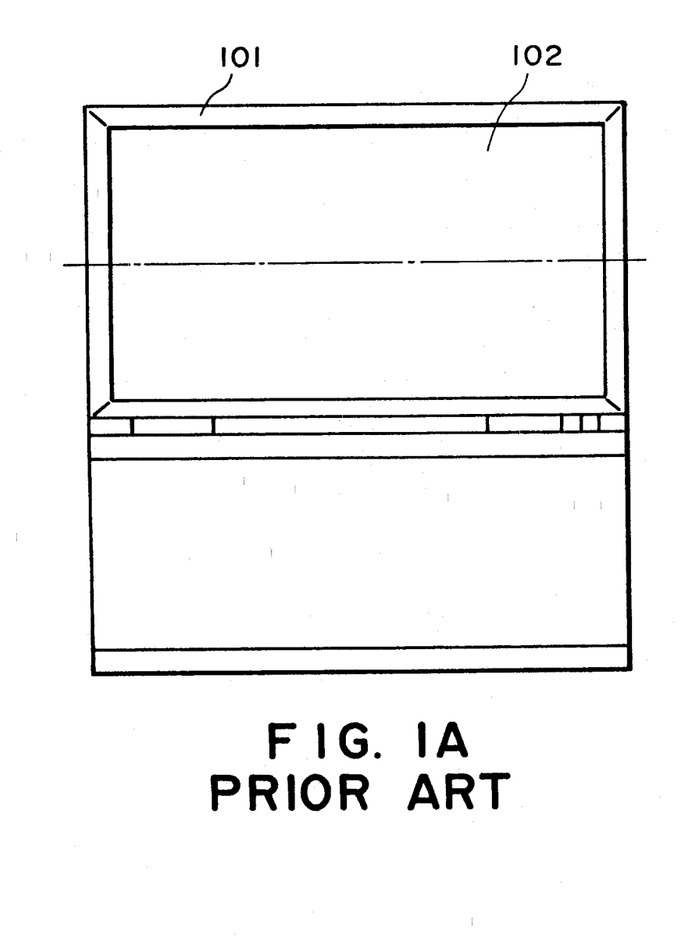
FIG. 1A is a front view and FIG. 1B is a side sectional view.
Figure 1B:
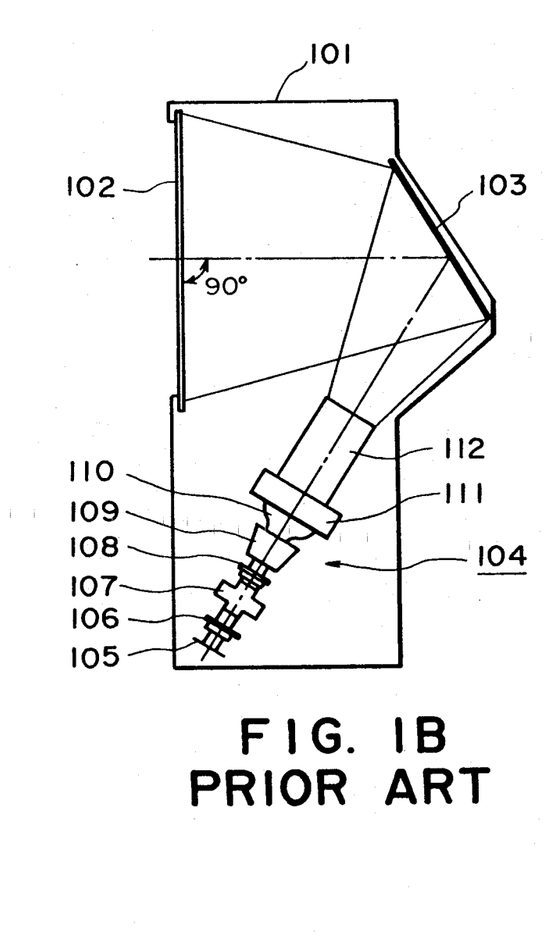

FIGS. 1A and 1B are a front view and a side elevational view showing a conventional example of a rear projection type receiver, respectively.

The rear projection type receiver comprises: a casing 101; a screen 102 which is attached to the front surface of the casing 101 in order to display an image; a mirror 103 which is attached to the inside of the back surface of the casing 101 with an angle of inclination; and three projection tubes 104 which are attached to the lower side in the casing 101 in order to project color lights corresponding to red, green, and blue components of the image onto the screen 102 [although only one projection tube is shown in FIG. 1B, three projection tubes are actually attached in parallel in the direction which is perpendicular to the paper surface].

The projection tube 104 is generally called a lens integrated type projection tube and comprises: a CRT socket board 105; a centering magnet 106; an electromagnetic focusing coil 107; a focusing magnet 108; a deflecting yoke 109; a CRT 110; a bracket 111; and a group of projection lenses 112 (refer to "Television Technology", Electronic Technology Publishing Co., Ltd., Vol. 34, pages 28-31, 1986).

In the rear projection type receiver, when the respective color lights which are projected from the projection tubes 104 are directly irradiated onto the screen 102, a depth of casing 101 increases. Therefore, by bending the light paths of the color lights by using the mirror 103, a compact size of the casing 101 is realized. Therefore, for instance, assuming that a distance from the front edge of the projection lens group 112 of each projection tube 104 to the screen 102 is set to 1,000 mm, the rear projection type receiver whose screen size is set to 50 inches (about 127 cm) and whose aspect ratio is set to 9:16 can be realized by the casing 101 whose height is set to 1,280 mm and whose depth is set to 700 mm.

In the above conventional rear projection type receiver, the color lights which are projected from the projection tubes 104 are reflected by the mirror 103 so that the color lights enter the screen 102 at an incident angle of 0° in the central portion of the screen 102 (refer to FIG. 1B). Therefore, since a distance from the lower edge of the screen 102 to the floor cannot be reduced because a space to enclose the projection tubes 104 must be assured, there are the following drawbacks.

(1) In the case where the receiver is used as a display for a desk top type computer or the like, its using form is limited or the like. An application field of the rear projection type receiver is limited as compared with the CRT direct viewing type receiver.

(2) In the case of using the receiver by connecting to a peripheral equipment such as video tape recorder, video disk player, or the like, it is difficult to assure enclosing spaces of those equipment.

SUMMARY OF THE INVENTION

It is an object of the invention to provide a small projector.

To accomplish the above object, the first embodiment of the invention has means for generating an image and means for projecting the image to a screen, wherein the projecting means has a projection lens system and a reflector, the projection lens system leads a light flux indicative of the image from the image generating means to the reflector so as to be away from the screen, and the reflector bends the light flux and leads the light flux from the reflector to the screen along a predetermined path. The generating means and the projection lens system are arranged in the vicinity of and parallel to the predetermined light path between the reflector and the screen.

The second embodiment of the invention comprises: a screen; an image generator; a projection lens system to lead a light flux indicative of an image from the image generator to a direction such as to be away from the screen; and a mirror assembly for bending the light flux from the projection lens system, for leading the light flux from the assembly toward the screen along a predetermined path, and for allowing a light beam which passes through one end of the path in the light flux to substantially perpendicularly enter the screen, wherein the generator and the projection lens system are arranged in the vicinity of and parallel to the predetermined light path between the reflector and the screen.

According to the invention, since the image generating means having an image generator or the like and the projection lens system are arranged near the path between the reflector of the mirror assembly or the like and the screen, the image generating means and the projection lens system can be enclosed near the screen and the reflector and the apparatus can be miniaturized.

According to the second embodiment, since such an arrangement is used, the mirror assembly is constructed in a manner such that the light flux from the projection lens system is bent and directed from the assembly to the screen along the predetermined path, a light beam which passes through one end of the path in the light flux is allowed to enter the screen substantially perpendicularly, an incident angle of the light beam which passes through the other end of the path to the screen is increased, thereby forming a blank space on the rear side of the screen. On the other hand, if the mirror assembly is constructed in a manner such that when the light flux indicative of the image is bent, the optical axis between the projection lens system and the mirror assembly and the optical axis between the mirror assembly and the screen do not intersect each other, and the path of the light flux is formed into an almost U- shape along a path from the image generator to the screen, the image generator and the projection lens system can be preferably laterally enclosed into the space as compared with the conventional construction.

According to a preferred embodiment of the invention, the screen has an eccentric Fresnel lens sheet, the reflector of the mirror assembly or the like bends the light flux indicative of the image so that the optical axis between the projection lens system and the mirror assembly and the optical axis between the mirror assembly and the screen do not intersect each other, and thereafter, the light flux is allowed to obliquely enter the screen, and the light flux is deflected in the direction perpendicular to the Fresnel lens sheet and is converged by the Fresnel lens sheet and is directed toward the pupil of a viewer. On the other hand, an incident angle of the light beam (principal ray) which passes through one end of the path in the light flux indicative of the image to the screen is preferably set to a value within a range from 0° to 5° (angle from the axis perpendicular to the surface of the screen).

If the reflector has at least one mirror and is constructed by a plurality of mirrors like the mirror assembly, the reflector can be formed so as to have a relatively small first mirror arranged near the projection lens system and a relatively large second mirror for again reflecting the light flux which was reflected by the first mirror and for directing the light flux toward the screen. Other constructions can be also obviously used. The first and second mirrors can be also separately arranged or can be also connected.

According to another preferred embodiment of the invention, the projection lens system is obliquely arranged together with the image generator (means) so that the optical axis has an angle of about 0° to 10° from the incident angle of the light flux to the screen.

According to the invention, a structure in which the projection lens system and the image generator (means) are integratedly constructed can be also used.

The image generator and the projection lens system can be arranged above, below or lateral to the light path of the light beam to be incident on the screen.

An image generator having a CRT, a liquid crystal display, or the like can be mentioned as an image generator which can be used in the invention.

According to the invention, a projector to display a monochromatic or color image can be constructed.

In the case of constructing a projector to display a color image, a display which can generate a color image by itself, an array of three displays which generate red, blue, and green images, or the like is used.

In the case of directing the light fluxes from the three displays toward the screen, a common lens system can be used or a special lens system can be also used every display.

Although the projector according to the invention is suitable as a rear projection type receiver for a television or a microfilm reader, it can be also used as an apparatus of the other type which projects an image.

BRIEF DESCRIPTION OF THE DRAWINGS

FIGS. 1A and 1B show a conventional example of a rear projection type receiver, in which

FIGS. 2A and 2B show the first embodiment of a rear projection type receiver according to the invention, in which

FIGS. 9A and 9B show the second embodiment of a rear projection type receiver of the invention, in which

FIGS. 10A and 10B show the third embodiment of a rear projection type receiver of the invention, in which

FIGS. 11A and 11B show the fourth embodiment of a rear projection type receiver of the invention, in which FIGS. 12A and 12B show the fifth embodiment of a rear projection type receiver of the invention, in which

DETAILED DESCRIPTION OF THE PREFERRED EMBODIMENTS

Embodiments of the invention will now be described hereinbelow with reference to the drawings.

Figure 2A:
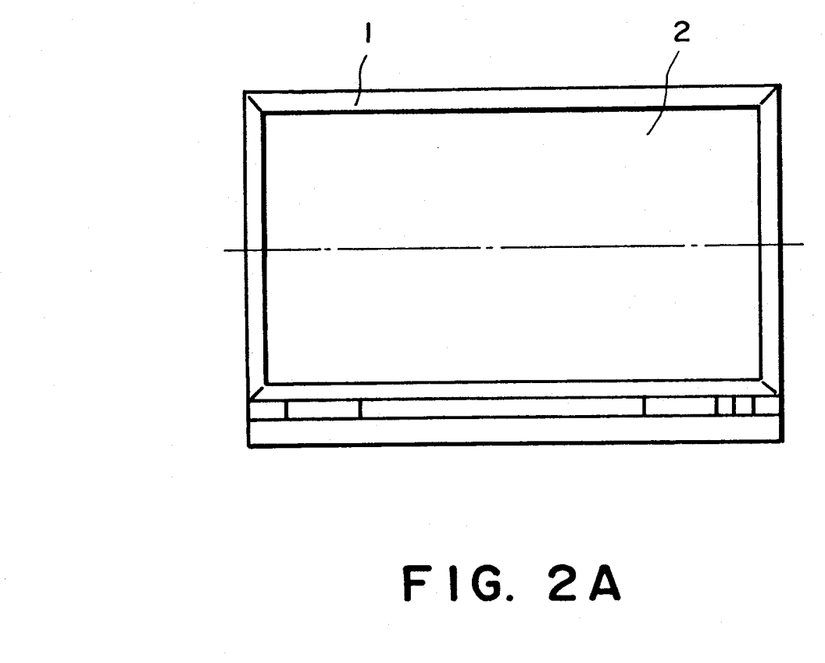
FIG. 2A is a front view and FIG. 2B is a side sectional view.
Figure 2B:
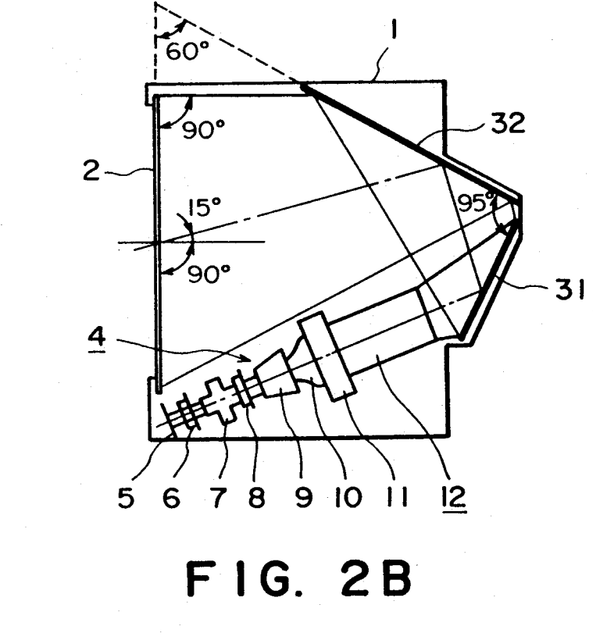
Figure 3:
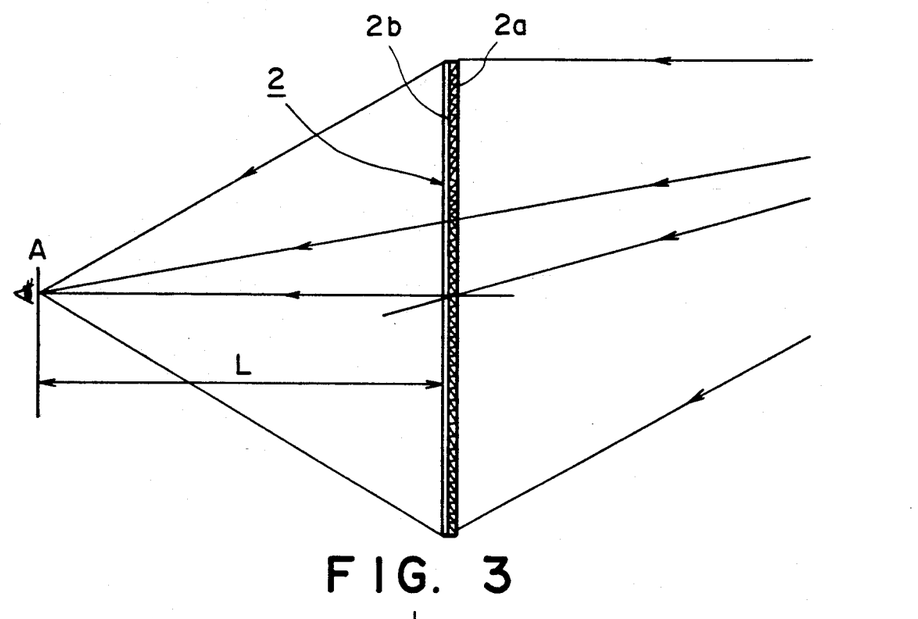
FIG. 3 is a side elevational view showing an example of a construction of a screen 2 in FIG. 2.
Figure 4:
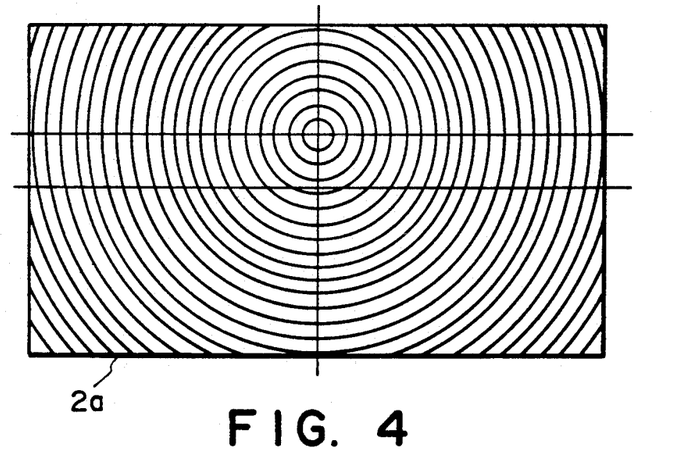
FIG. 4 is a front view of an eccentric Fresnel lens 2a in FIG. 3.
Figure 5:
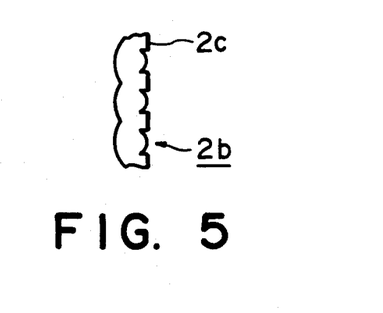
FIG. 5 is a top cross sectional view showing a part of an example of a construction of a double lenticular lens 2b in FIG. 3.
Figure 6:
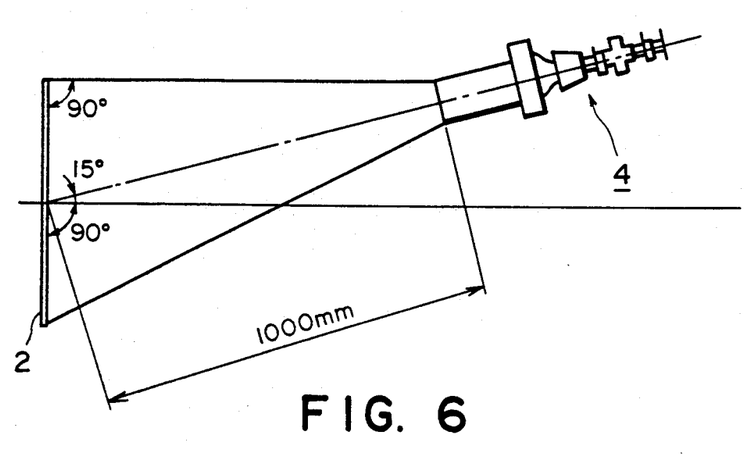
FIG. 6 is a diagram showing an equivalent positional relation between the screen 2 and a projection tube 4 in FIG. 2.
Figure 7:
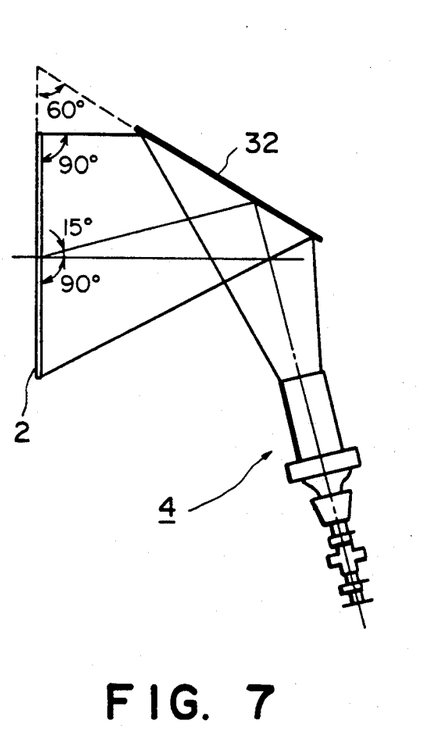
FIG. 7 is a diagram showing the position of the projection tube 4 in the case where an optical path of a light which is emitted from the projection tube 4 was bent by using only a second mirror 32.
Figure 8:
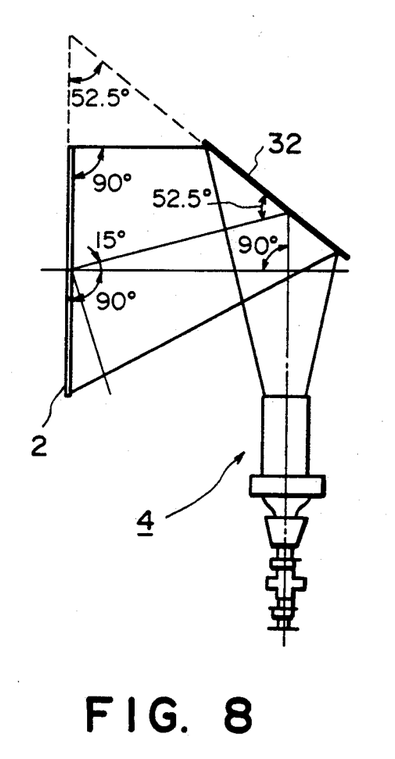
FIG. 8 is a diagram showing a limitation of an attaching angle of the second mirror 32.

FIGS. 2A and 2B are a front view and a side sectional view showing a rear projection type receiver of the first embodiment according to the invention, respectively. FIG. 3 is a side elevational view showing an example of a construction of a screen 2 in FIG. 2. FIG. 4 is a front view of an eccentric Fresnel lens 2a in FIG. 3. FIG. 5 is a top cross sectional view showing a part of a construction of a double lenticular lens 2b in FIG. 3. FIG. 6 is a diagram showing an equivalent positional relation between the screen 2 and a projection tube 4 in FIG. 2. FIG. 7 is a diagram showing the position of the projection tube 4 in the case where an optical path of a light which is emitted from the light projection tube 4 was bent by using only a second mirror 32. FIG. 8 is a diagram showing a limitation of an attaching angle of the second mirror 32.

The rear projection type receiver of the embodiment comprises: a casing 1; the screen 2 which is attached to a front surface of the casing 1; a small first mirror 31 and the large second mirror 32 which are attached to the rear inside of the casing 1 and are formed by surface mirrors each having a reflectance within a range from 90 to 100%; and the projection tube 4 enclosed on the lower side of the casing 1.

The projection tube 4 is a well-known lens integrated type projection tube similar to the projection tube 104 shown in FIG. 1. The projection tube 4 comprises: a CRT socket board 5; a centering magnet 6; an electromagnetic focusing coil 7; a focusing magnet 8; a deflecting yoke 9; a CRT 10 of seven inches; a bracket 11; and a group of projection lenses 12. The projection lens group 12 comprises glass or hybrid lenses and is constructed in a manner such that an F number is set to a value within a range from F1.0 to F1.2 and a distance from the front edge of the lens to the center of the screen 2 is set to about 1,000 mm and an image which is formed by the CRT 10 is enlargedly projected. The CRT socket board 5, centering magnet 6, electromagnetic focusing coil 7, focusing magnet 8, and deflecting yoke 9 are attached to the CRT 10 and those components function so as to form a preferable image on the CRT 10. Three projection tubes 4 for color lights of red, green, and blue are arranged in the direction perpendicular to the paper surface of FIG. 2B and are enclosed in the casing 1. The CRT 10 and the projection lens group 12 are coupled by the bracket 11 also serving as a heat radiation fin. A space between the CRT 10 and the projection lens group 12 is filled with a transparent coolant such as an aqueous solution of ethylene glycol or the like, thereby improving a luminance and a contrast of the apparatus.

As shown in FIG. 3, the screen 2 comprises the eccentric Fresnel lens 2a and the double lenticular lens 2b. The eccentric Fresnel lens 2a is made of a methacrylic resin or the like in which a light transmittance is 90% or more and a thickness lies within a range from 0.5 to 5 mm and a refractive index is equal to about 1.5. The double lenticular lens 2b functions so as to widen right and left angles of visibility. The screen 2 is attached to the casing 1 so that the double lenticular lens 2b is located on the side of a viewer A. As shown in FIG. 4, the eccentric Fresnel lens 2a is decentered such that the center of a number of concentric circular prisms formed on the prism surface is located to the upper side than the center of the screen 2. The prism surface is directed to the viewer A. The surface which faces the eccentric Fresnel lens 2a and is located on the side opposite to the prism surface is worked so as to have a flat surface. As shown in FIG. 5, both surfaces of the double lenticular lens 2b are constructed by a group of fine barrel-shaped lenses. The above fine lenses and black stripes 2c to emphasize the contrast are alternately formed on the surface of the double lenticular lens 2b on the side of the viewer A.

As shown in FIG. 2, the first mirror 31 is arranged on the optical path of the light which is emitted from the projection tube 4 in the direction which is opposite to the screen 2 and is away therefrom. The first mirror 31 reflects the light to the upper side of the casing 1. The second mirror 32 is arranged on the optical path of the light which was reflected by the first mirror 31. The second mirror 32 reflects the reflected light in the direction of the screen 2. The first and second mirrors 31 and 32 are arranged in the casing 1 in a manner such that an angle which is formed by the first and second mirrors is equal to 95° and an angle which is formed by the second mirror 32 and the screen 2 is equal to 60°, respectively. Thus, the light reflected by the second mirror 32 is led such that the light beam which passes through the upper edge of the optical path of such a reflected light enters the screen 2 at an incident angle of 0° on the upper side of the screen 2 and that the light beam which passes through the center of such an optical path enters the screen 2 at an incident angle of 15° at the center of the screen 2, respectively. Therefore, in the embodiment, as shown in FIG. 6, the position of the projection tube 4 for the screen 2 is equivalently set to the right upper side of the screen 2.

The operation of the rear projection type receiver of the embodiment will now be described.

In the rear projection type receiver, as shown in FIG. 2B, the color lights corresponding to the red, green, and blue components of the image signals which are emitted from the three projection tubes including the projection tube 4 are bent like a U-shape by the first and second mirrors 31 and 32. After that, they are projected to the screen 2, so that a color image is formed on the screen 2. As shown in FIG. 3, the color lights which were projected to the screen 2 are converged to the eyes of the viewer A locating at the height of the center position of the screen 2 by the eccentric Fresnel lens 2a. Therefore, the viewer A can observe the color image which is displayed on the screen 2 at the height of the dyes in a manner similar to the conventional apparatus. In the embodiment, a distance L from the viewer A to the screen 2 is set to a value within a range from 3H to 6H, in which H denotes a height of the screen 2.

Therefore, in the rear projection type receiver, the optical paths of the color lights which are emitted from the projection tube 4 are bent like a U shape by the first and second mirrors 31 and 32 and the principal ray of the color light which enters the upper side of the screen 2 is projected to the screen 2 at an incident angle of 0°. Therefore, as shown in FIG. 2B, a space to enclose the projection tube 4 is assured on the rear side of the screen 2 of the casing 1. The projection tube 4 can be laterally arranged as compared with the conventional apparatus shown in FIG. 1B, so that the height of the casing 1 can be set to a very low height. Thus, in the case of manufacturing the rear projection type receiver in which a screen size is equal to 50 inches and an aspect ratio is set to 9:16 as mentioned above, the receiver can be realized by the casing 1 in which a height is equal to about 800 mm (about 1,280 mm) and a depth is equal to 820 mm (about 700 mm) according to the embodiment and a compact size can be accomplished as compared with the conventional example whose dimensions are shown in the above parentheses.

Attaching angles of the first and second mirrors 31 and 32 will now be described.

As described above, the rear projection type receiver of the embodiment is equivalent to the receiver in which the projection tube 4 is arranged in the right upper portion on the rear side of the screen 2 as shown in FIG. 6. To reduce the depth of such an equivalent receiver, in the case where the optical path of the light which is emitted from the projection tube 4 was bent by using only the second mirror 32 in a manner similar to the conventional apparatus shown in FIG. 1, the projection tube 4 is located on the lower side of the screen 2 as shown in FIG. 7. In this case, although the depth of the receiver is decreased, the height of the receiver increases because the projection tube 4 is nearly vertically enclosed in the casing 1. Therefore, in the rear projection type receiver in the embodiment, by previously once bending the optical path of the light which is emitted from the projection tube 4 by using the first mirror 31, the projection tube 4 is set to the position shown in FIG. 2, thereby reducing both of the depth and height of the receiver. However, to bend the optical path of the light which is emitted from the projection tube 4 by using the first mirror 31, a limitation in the case of vertically arranging the projection tube 4 as shown in FIG. 8 is maximum. At this time, an angle which is formed by the second mirror 32 and the screen 2 is set to 52.5°. Therefore, the attaching angle of the second mirror 32 is set so that an angle between the second mirror and the screen 2 lies within a range from 52.5° to 90°. A limit value of the angle between the first and second mirrors 31 and 32 is set to an angle at which the projection tube 4 starts to obstruct the light which is projected to the lower side of the screen 2. Such a limit angle depends on the size of the projection tube 4 or the like.

A lower limit value of the angle between the second mirror 32 and the screen 2 is generally set to $(90° + \theta°)/2$ when assuming that an incident angle of the light which is projected to the central portion of the screen 2 is set to $\theta°$.

The lower limit value of the angle between the second mirror 32 and the screen 2 can be also further reduced by slightly enlarging the depth of the receiver.

Figure 9A:
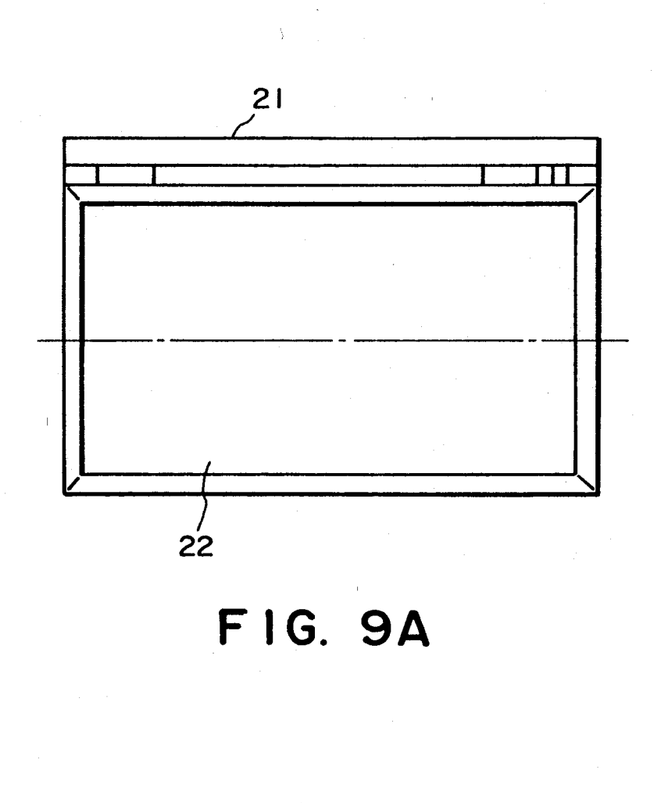
FIG. 9A is a front view and FIG. 9B is a side sectional view.
Figure 9B:
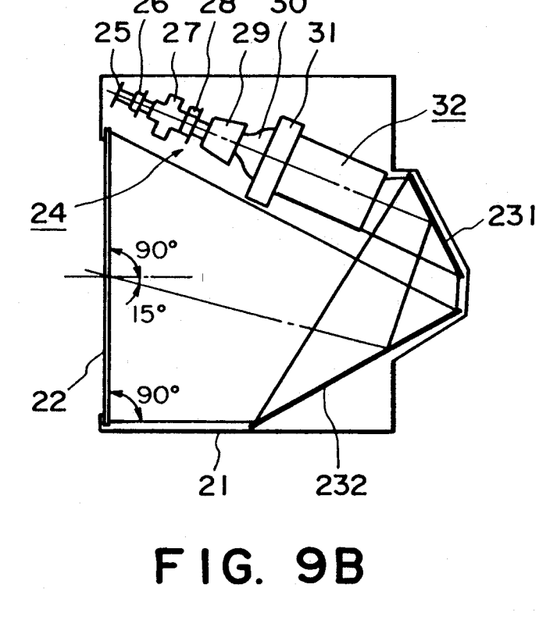

FIGS. 9A and 9B are a front view and a side sectional view showing the second embodiment of the rear projection type receiver of the invention, respectively.

In the rear projection type receiver shown in FIG. 2, the projection tube 4 has been enclosed on the lower side (lower side of the screen 2) of the casing 1. However, in the second embodiment, a projection tube 24 is enclosed on the upper side (upper side of a screen 22) of a casing 21 and an arrangement of a first mirror 231 and a second mirror 232 is also opposite to that in the first embodiment shown in FIG. 2. That is, the first mirror 231 is arranged on the upper side of the casing 21 and the second mirror 232 is arranged on the lower side of the casing 21, respectively. Therefore, in the embodiment, the color lights which are projected to the lower side of the screen 22 enter the screen 22 at an incident angle of 0°.

In the case of using the rear projection type receiver of the second embodiment by hanging down from the ceiling or the like, the receiver can be attached easier than the case of the first embodiment shown in FIG. 1. The other effects are similar to those in the first embodiment.

Figure 10A:
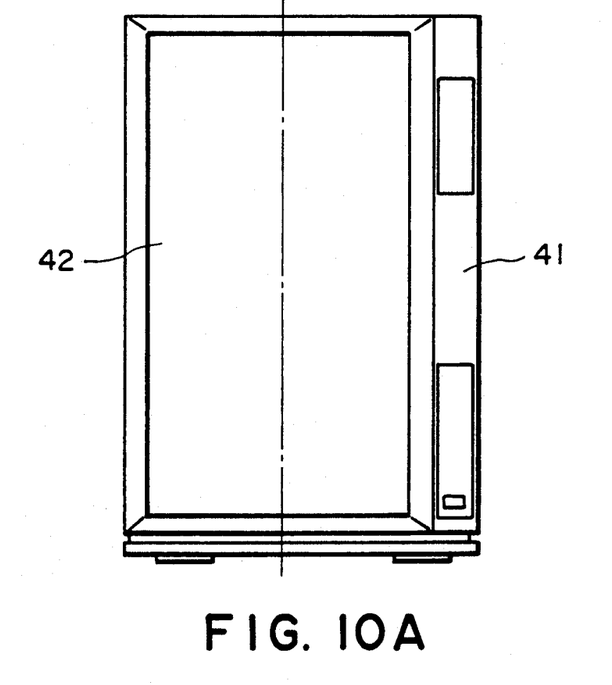
FIG. 10A is a front view and FIG. 10B is a top cross sectional view.
Figure 10B:
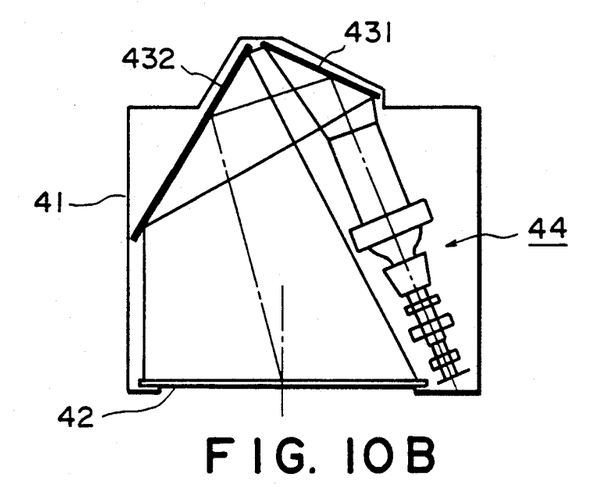

FIGS. 10A and 10B are a front view and a top cross sectional view showing the third embodiment of a rear projection type receiver of the invention, respectively.

The rear projection type receiver of the third embodiment has a structure in which the receiver of the first embodiment shown in FIG. 2 is rotated by 90° and is set vertically. A projection tube 44 is enclosed on the right side (right side of a screen 42) of a casing 41. Optical paths of color lights which are emitted from the projection tube 44 are bent like a U-shape by a first mirror 431 and a second mirror 432 so that the color lights which are projected to the left side of the screen 42 enter the screen 42 at an incident angle of 0°, respectively.

In the case of using the screen 42 in a vertical longitudinal state, the rear projection type receiver of the third embodiment is more advantageous than the receivers shown in FIGS. 2 and 9 with respect to the installation and the like. The other effects are similar to those in the receiver shown in FIG. 2.

It is also possible to construct in a manner such that the projection tube 44 is enclosed on the left side (left side of the screen 42) of the casing 41 and the color lights which are projected to the right side of the screen 42 enter the screen 42 at an incident angle of 0°.

Figure 11A:
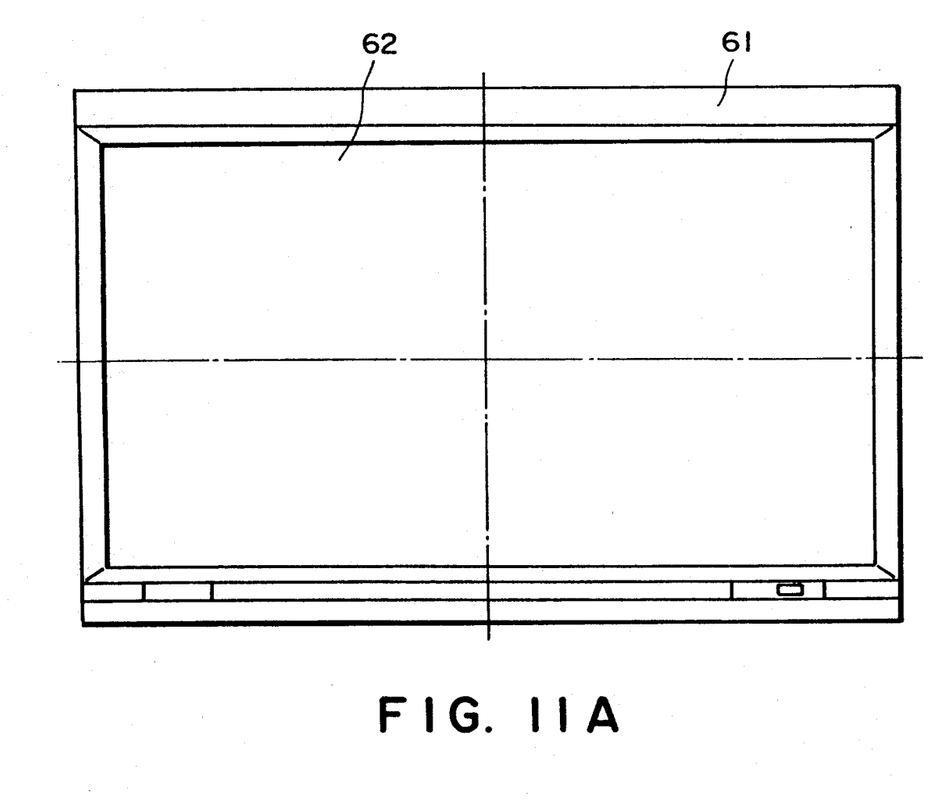
FIG. 11A is a front view and FIG. 11B is a side sectional view.
Figure 11B:
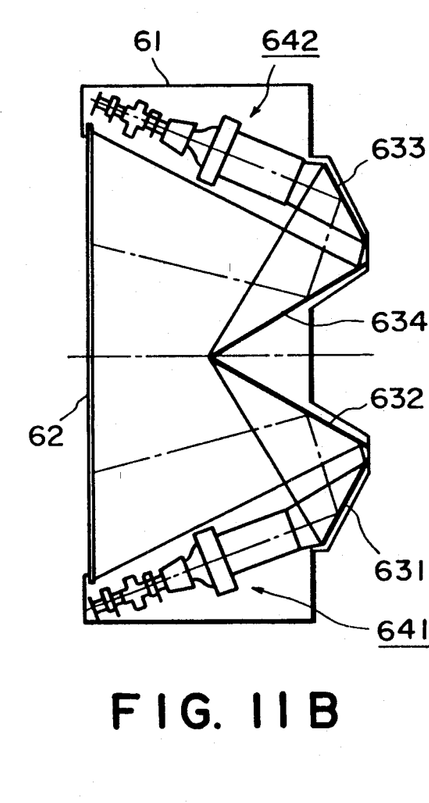

FIGS. 11A and 11B are a front view and a side sectional view showing the fourth embodiment of a rear projection type receiver of the invention, respectively.

The rear projection type receiver of the fourth embodiment is constructed in a manner such that four projection tubes (only a first projection tube 641 and a second projection tube 642 are shown in the diagrams) are used and one image or four different images are displayed to a screen 62 which are separated into four sections. Two projection tubes including the first projection tube 641 among the four projection tubes are enclosed on the lower side of a casing 61 and remaining two projection tubes including the second projection tube 642 are enclosed on the upper side of the casing 61. First and second mirrors 631 and 632 are arranged in a manner similar to the first and second mirrors 31 and 32 shown in FIG. 2. Third and fourth mirrors 633 and 634 are arranged in a manner similar to the first and second mirrors 231 and 232 shown in FIG. 9. The second and fourth mirrors 632 and 634 are arranged so that one side of the second mirror comes into contact with one side of the fourth mirror at the height of the central portion of the screen 62. Each of the first to fourth mirrors 631 to 634 has almost the same length as a length in the lateral direction of the screen 62. In the fourth embodiment, the color lights which are projected to the central portion of the screen 62 enter the screen 62 at an incident angle of 0°.

In the embodiment, since four projection tubes are used, the effect to realize a compact size is further enhanced. It is also possible to construct a system by combining four vertically longitudinal receivers shown in FIG. 8 in a manner similar to the fourth embodiment.

Figure 12A:
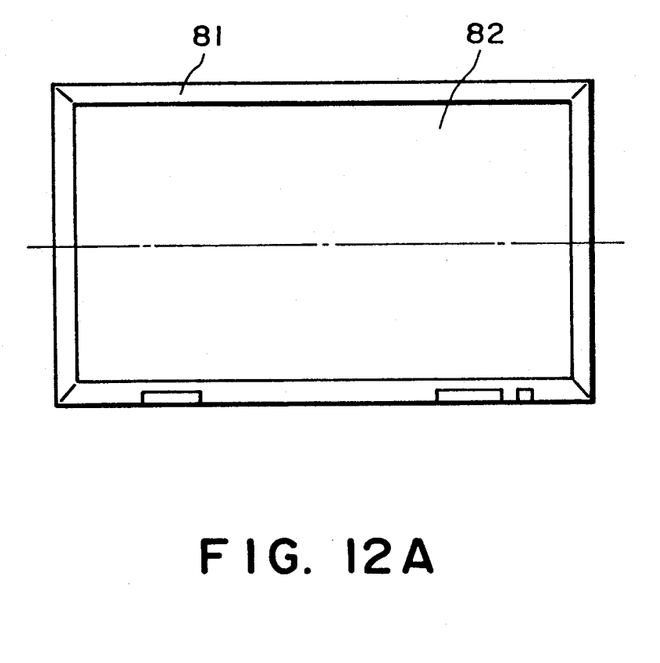
FIG. 12A is a front view and FIG. 12B is a side sectional view.
Figure 12B:
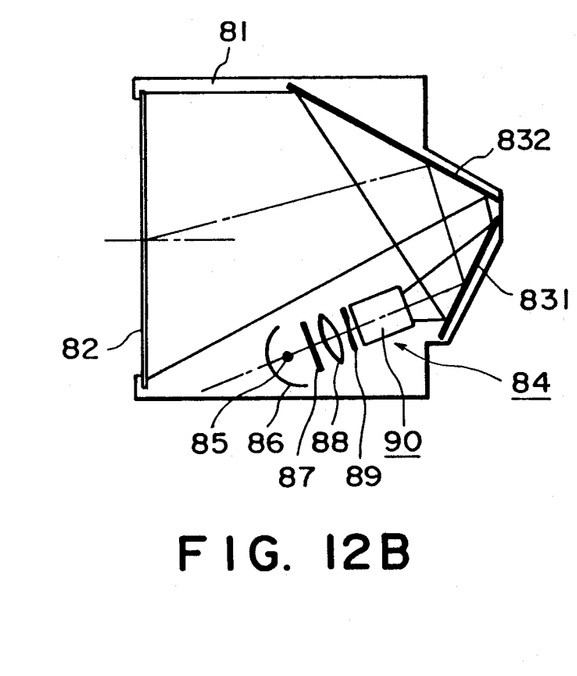

FIGS. 12A and 12B are a front view and a side sectional view showing the fifth embodiment of a rear projection type receiver of the invention, respectively.

The rear projection type receiver of the fifth embodiment uses a liquid crystal projecting apparatus 84 as projecting means in place of the projection tube 4 in the rear projection type receiver shown in FIG. 2. A construction of a mirror assembly and the like are substantially the same as those shown in FIG. 2. The liquid crystal projecting apparatus 84 comprises: a light source lamp 85 to emit a white light; a reflector 86 to reflect the white light; a thermal filter 87 to reflect a heat ray in the incident white light; a condenser lens 88 to convert the incident white light into the parallel white light; a liquid crystal display 89 to modulate the parallel white light in accordance with an image signal; and a group of projection lenses 90 to project the parallel white light which was modulated by the display 89 to the screen 82 through a first mirror 831 and a second mirror 832.

In the embodiment, a compact size can be realized by using the liquid crystal projecting apparatus 84. Even in the rear projection type receivers shown in FIGS. 9 to 11, a further compact size can be realized by using the liquid crystal projecting apparatus 84.

The liquid crystal projecting apparatus 84 is not limited to the construction shown in FIG. 12 but can also use a structure comprising: three liquid crystal displays for respectively separating the parallel white light which is transmitted from the condenser lens 88 to the color lights of red, green, and blue and for modulating the color lights in accordance with the red, green, and blue components of the image signal; a single projection lens or a group of three projection lenses; and the like.

In the rear projection type receiver shown in FIG. 2, the color lights which are projected to the upper side of the screen 2 enter the screen 2 at an incident angle of 0°. However, similar effects are also obtained if the color lights enter the screen 2 at an incident angle within a range of 0°±5°. The same shall also applied to the embodiments shown in FIGS. 9 to 12.

In the rear projection type receivers constructed as mentioned above, the optical path of the light which is projected from the projecting means to the screen is bent like a U-shape and on the side of the screen opposite to the side on which the projecting means is enclosed, the light beam at the edge of the light is allowed to enter the screen at an incident angle within a range of 0°±5°, so that the projecting means can be laterally installed as compared with the conventional receiver. There is an effect such that a compact size can be realized.

On the upper or lower side of the screen, by allowing the light beam at the edge of the light to enter the screen at an incident angle within a range of 0°±5°, there is an effect such that a compact size of an ordinary laterally long rear projection type receiver can be realized.

By constructing the screen by using the eccentric Fresnel lens, there is an effect such that the light which transmits the screen can be directed to the viewer who faces the screen.

The screen which is used in the invention is not limited to the forms shown in FIGS. 3 to 5 but any proper one of well-known various kinds of screens can be selected and used.

In each of the foregoing embodiments, the optical axes of the projection tubes 4, 24, 44, and 64 and the projecting apparatus 84, which axes are determined by the lens groups of them, are inclined by an angle of about 22° for the axis perpendicular to the screen. Such an angle is close to the angle of 15° between the screen and the optical axes along the optical path between the screen and the second mirror. As mentioned above, by constructing the apparatus in a manner such that the optical axis of the projection tube or the projecting apparatus is inclined at an angle of about 0° to 10° for the optical axis between the screen and the second mirror, the apparatus can be sufficiently miniaturized.

On the other hand, a construction, an arrangement, and the like of the first and second mirrors as reflectors are also not limited to the structure shown in each of the embodiments. For instance, both of the first and second mirrors can be also connected.

What is claimed is:

1. A projector comprising: means for generating an image; and
   means for projecting the image to a screen, said projecting means having a projection lens system, a first reflector and a second reflector, where said projection lens system directs a light beam indicative of the image from said generating means to said first reflector in a direction away from said screen, and said first reflector reflects the light beam incident thereon so that the light beam is folded thereat to be directed to said second reflector, and said second reflector reflects the light beam incident thereon so as to be folded thereat and to be directed to said screen such that an optical axis between said projection lens system and said first reflector and an optical axis between said second reflector and said screen do not intersect each other and such that the light beam is caused to be obliquely incident on said screen and a marginal portion of the light beam to be incident on said screen at the side opposed to the arrangement of said generating means and said projection lens system is caused to be incident on the screen with an incident angle of 0° to 5°, and wherein said generating means and said projection lens system are successively arranged from said screen so as to be disposed adjacent to the light beam from said second reflector to said screen.

2. A projector according to claim 1, wherein the projection lens system is obliquely arranged together with the generating means in a manner such that an angle between the optical axis of the projection lens system and an incident angle of the light flux to the screen lies within a range from 0° to 10°.

3. A projector according to claim 1, wherein the generating means has:
   a first generator to form a red image;
   a second generator to form a blue image; and
   a third image to form a green image.

4. A projector according to claim 3, wherein the projection lens system has:
   a first projection lens to project the image of the first generator;
   a second projection lens to project an image of the second generator; and
   a third projection lens to project an image of the third generator.

5. A projector according to claim 3, wherein the projection lens system has a single lens assembly to project the images of the first, second, and third generators.

6. A projector according to claim 1, wherein the generating means and the projection lens system are integratedly constructed.

7. A projector according to claim 1, wherein said first reflector and said second reflector are mutually connected.

8. A projector according to claim 3, wherein said generating means has a CRT.

9. A projector according to claim 4, wherein said generating means has a CRT.

10. A projector according to claim 5, wherein said generating means has a CRT.

11. A projector according to claim 3, wherein said generating means has a liquid crystal display.

12. A projector according to claim 4, wherein said generating means has a liquid crystal display.

13. A projector according to claim 5, wherein said generating means has a liquid crystal display.

14. A projector comprising:
    means for generating an image; and
    means for projecting said image to a screen;
    wherein said projecting means has a projection lens system and reflectors;
    wherein said projection lens system directs a light beam indicative of the image from said generating means to said reflectors in a direction away from said screen, and said reflectors reflect the light beam incident thereon so that the light beam is folded thereat and to be directed to said screen such that an optical axis between said projection lens system and each of said reflectors and an optical axis between another reflector and said screen do not intersect each other;
    wherein said reflectors are arranged such that when tracing the light path in order from said screen, said reflectors and said projection lens system, the light path between any of said reflectors and said projection lens system is directed toward said screen;
    and wherein said reflectors direct said light beam to said screen such that the light beam is caused to be obliquely incident on said screen and a marginal portion of the light beam to be incident on said screen at the side opposed to the arrangement of said generating means and said projection lens system is caused to be incident on said screen with an incident angle of 0° to 5°.

15. A projector comprising:
    a screen;
    means for projecting an image; and
    means for projecting said image to said screen, said projecting means having a projection lens system, a first reflector and a second reflector, wherein said projection lens system directs a light beam indicative of the image from said generating means to said first reflector in a direction away from said screen, and said first reflector reflects the light beam incident thereon so that the light beam is folded thereat to be directed to said second reflector, and said second reflector reflects the light beam incident thereon so as to be folded thereat and to be directed to said screen such that an optical axis between said projection lens system and said first reflector and said screen do not intersect each other, and said second reflector bends the light flux so that the light flux obliquely enters the screen, and said generating means and said projection lens system are successively arranged from said screen so as to be disposed adjacent to the light beam from said second reflector to said screen, and wherein the screen has an eccentric Fresnel lens sheet and said sheet deflects the light flux in the direction perpendicular to the sheet and also converges the light flux.

16. A projector according to claim 15, wherein the first and second mirrors are connected.

17. A projector according to claim 15, wherein the projection lens system is obliquely arranged together with the generator in a manner such that an angle between the optical axis of the projection lens system and an incident angle of the light flux to the screen lies within a range from 0° to 10°.

18. A projector according to claim 15, wherein the projection lens system and the generator are integratedly constructed.

19. A projector according to claim 15, wherein said generating means has:
 a first generator to form a red image;
 a second generator to form a blue image; and
 a third generator to form a green image.

20. A projector according to claim 19, wherein the projection lens system has:
 a first projection lens to project the image of the first generator;
 a second projection lens to project the image of the second generator; and
 a third projection lens to project the image of the third generator.

21. A projector according to claim 19, wherein the projection lens system has a single lens assembly to project the images of the first, second, and third generators.

22. A projector according to any one of claims 19 to 21, wherein said generating means has a CRT.

23. A projector according to any one of claims 19 to 21, wherein said generating means has a liquid crystal display.

24. A projector according to claim 15, wherein said generating means and the projection lens system are arranged at a lower position of the light beam.

25. A projector according to claim 15, wherein said generating means and the projection lens system are arranged at an upper or side position of the light beam.

26. A projector comprising:
 a screen;
 means for generating an image; and
 means for projecting said image to said screen, said projecting means having a projection lens system, a first reflector and a second reflector, wherein said projection lens system directs a light beam indicative of the image from said generating means to said first reflector in a direction away from said screen, and said first reflector reflects the light beam incident thereon so that the light beam is folded thereat to be directed to said second reflector, and said second reflector reflects the light beam incident thereon so as to be folded thereat and to be directed to said screen such that an optical axis between said projection lens system and said first reflector and said screen do not intersect each other and to be directed to said screen such that the light beam is caused to be obliquely incident on said screen and a marginal portion of the light beam to be incident on said screen at the side opposed to the arrangement of said generating means and said projection lens system is caused to be incident on the screen with an incident angle of 0° to 5°, and wherein said generating means and said projection lens system are successively arranged from said screen so as to be disposed adjacent to the light beam from said second reflector to said screen.

27. A projector comprising:
 means for generating an image; and
 means for projecting having a projection lens system, a first reflector and a second reflector, wherein said projection lens system directs a light beam indicative of the image from said generating means to said first reflector in a direction away from said screen, and said first reflector reflects the light beam incident thereon so that the light beam is folded thereat to be directed to said second reflector, and said second reflector reflects the light beam incident thereon so as to be folded thereat and to be directed to said screen such that an optical axis between said projection lens system and said first reflector and an optical axis between said second reflector and said screen do not intersect each other and to be directed to said screen such that the light beam is caused to be obliquely incident on said screen and a marginal portion of the light beam to be incident on said screen at the side opposed to the arrangement of said generating means and said projection lens system is caused to be incident on the screen with an incident angle of 0° to 5°, and wherein said first reflector and said second reflector are arranged such that when tracing the light path in order from said screen, said second reflector, said first reflector and said projection lens system, the light path between said first reflector and said projection lens system is directed toward said screen.

28. A projector comprising:
 means for generating an image; and
 means for projecting having a projection lens system, a first reflector and a second reflector, wherein said projection lens system directs a light beam indicative of the image from said generating means to said first reflector in a direction away from said screen and said lens system is obliquely arranged together with the generating means in a manner such that an angle between the optical axis of the projection lens system and an incident angle of the light flux to the screen lies within a range from 0° to 10°, and said first reflector reflects the light beam incident thereon so that the light beam is folded thereat to be directed to said second reflector, and said second reflector reflects the light beam incident thereon so as to be folded thereat and to be directed to said screen such that an optical axis between said projection lens system and said first reflector and an optical axis between said second reflector and said screen do not intersect each other and said second reflector reflects the light beam incident thereon so as to be folded and be obliquely incident on said screen, and wherein said first reflector and said second reflector are arranged such that when tracing the light path in order from said screen, said second reflector, said first reflector and said projection lens system, the light path between said first reflector and said projection lens system is directed toward said screen.

29. A projector according to claim 27, wherein the projection lens system is obliquely arranged together with the generating means in a manner such that an angle between the optical axis of the projection lens system and an incident angle of the light flux to the screen lies within a range from 0° to 10°.

30. A projector according to claim 27, wherein the generating means has:
a first generator to form a red image;
a second generator to form a blue image; and
a third generator to form a green image.

31. A projector according to claim 30, wherein the projection lens system has:
a first projection lens to project the image of the first generator;
a second projection lens to project an image of the second generator; and
a third projection lens to project an image of the third generator.

32. A projector according to claim 30, wherein the projection lens system has a single lens assembly to project the images of the first, second and third generators.

33. A projector according to claim 27, wherein the generating means and the projection lens system are integratedly constructed.

34. A projector according to claim 27, wherein said first reflector and said second reflector are mutually connected.

35. A projector according to claim 30, wherein said generating means has a CRT.

36. A projector according to claim 31, wherein said generating means has a CRT.

37. A projector according to claim 32, wherein said generating means has a CRT.

38. A projector according to claim 30, wherein said generating means has a liquid crystal display.

39. A projector according to claim 31, wherein said generating means has a liquid crystal display.

40. A projector according to claim 32, wherein said generating means has a liquid crystal display.

41. A projector comprising:
a screen;
means for generating an imaged; and means for projecting the image to a screen, said projecting means having a projection lens system, a first reflector and a second reflector, wherein said projection lens system directs a light beam indicative of the image from said generating means to said first reflector in a direction away from said screen, and said first reflector reflects the light beam incident thereon so that the light beam is folded thereat to be directed to said second reflector, and said second reflector reflects the light beam incident thereon so as to be folded thereat and to be directed to said screen such that an optical axis between said projection lens system and said first reflector and an optical axis between said second reflector and said screen do not intersect each other, and said second reflector directs the light beam to said screen such that the light beam is caused to obliquely incident on said screen and a marginal portion of the light beam to be incident on said screen at the side opposed to the arrangement of said generating means and said projection lens system is caused to be incident on the screen with an incident angle of 0° to 5°, and wherein said first reflector and said second reflector are arranged such that when tracing the light path in order from said screen, said second reflector, said first reflector and said projection lens system, the light path between said first reflector and said projection lens system is directed toward said screen.

42. A projector according to claim 41, wherein the projection lens system is obliquely arranged together with the generating means in a manner such that an angle between the optical axis of the projection lens system and an incident angle of the light flux to the screen lies within a range of 0° to 10°.

43. A projector according to claim 41, wherein the generating means has:
a first generator to form a red image;
a second generator to form a blue image; and
a third generator to form a green image.

44. A projector according to claim 43, wherein the projection lens system has:
a first projection lens to project the image of the first generator;
a second projection lens to project an image of the second generator; and
a third projection lens to project an image of the third generator.

45. A projector according to claim 43, wherein the projection lens system has a single lens assembly to project the images of the first, second and third generators.

46. A projector according to claim 41, wherein the generating means and the projection lens system are integratedly constructed.

47. A projector according to claim 43, wherein the generating means has a CRT.

48. A projector according to claim 44, wherein said generating means has a CRT.

49. A projector according to claim 45, wherein said generating means has a CRT.

50. A projector according to claim 43, wherein said generating means has a liquid crystal display.

51. A projector according to claim 44, wherein said generating means has a liquid crystal display.

52. A projector according to claim 45, wherein said generating means has a liquid crystal display.

53. A projector according to claim 41, wherein said generating means and said projection lens system are disposed under the light beam between said second reflector and said screen.

54. A projector according to claim 41, wherein said generating means and said projection lens system are disposed under the light beam between said second reflector and said screen, or laterally to said light beam.

55. A projector according to claim 11, wherein the projection lens system is obliquely arranged together with the generator in a manner such that an angle between the optical axis of the injection lens system and an incident angle of the light flux to the screen lies within a range from 0° to 10°.

56. A projector according to claim 11, wherein the projection lens system and the generator are integratedly constructed.

57. A projector comprising:
means for generating an image; and
means for projecting said image to a screen;

wherein said projecting means has a projection lens system and reflectors;

wherein said projection lens system directs a light beam indicative of the image from said generating means to said reflectors in a direction away from said screen, and said reflectors reflect the light beam incident thereon so that the light beam is folded thereat and to be directed to said screen such that an optical axis between said projection lens system and each of said reflectors and an optical axis between another reflector and said screen do not intersect each other;

wherein said generating means and said projection lens system are successively arranged from said screen so as to be disposed adjacent to the light beam from said reflectors to said screen;

and wherein said reflectors direct said light beam to said screen such that the light beam is caused to be obliquely incident on said screen and a marginal portion of the light beam to be incident on said screen at the side opposed to the arrangement of said generating means and said projection lens system is caused to be incident on said screen with an incident angle of 0° to 5°.

* * * * *